(12) United States Patent
Hatta et al.

(10) Patent No.: US 12,323,311 B2
(45) Date of Patent: Jun. 3, 2025

(54) PACKET CAPTURE SYSTEM, METHOD AND PROGRAM

(71) Applicant: Nippon Telegraph and Telephone Corporation, Tokyo (JP)

(72) Inventors: Saki Hatta, Tokyo (JP); Hiroyuki Uzawa, Tokyo (JP); Shuhei Yoshida, Tokyo (JP); Koyo Nitta, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 166 days.

(21) Appl. No.: 18/254,101

(22) PCT Filed: Dec. 9, 2020

(86) PCT No.: PCT/JP2020/045811
§ 371 (c)(1),
(2) Date: May 23, 2023

(87) PCT Pub. No.: WO2022/123676
PCT Pub. Date: Jun. 16, 2022

(65) Prior Publication Data
US 2023/0421463 A1    Dec. 28, 2023

(51) Int. Cl.
*G06F 15/173* (2006.01)
*H04L 43/026* (2022.01)
*H04L 43/028* (2022.01)
*H04L 47/32* (2022.01)

(52) U.S. Cl.
CPC .......... *H04L 43/028* (2013.01); *H04L 43/026* (2013.01); *H04L 47/32* (2013.01)

(58) Field of Classification Search
CPC ...... H04L 43/028; H04L 43/026; H04L 47/32
See application file for complete search history.

(56) References Cited

U.S. PATENT DOCUMENTS

| 10,911,579 | B1* | 2/2021 | Volpe | H04L 47/2483 |
| 2007/0083924 | A1* | 4/2007 | Lu | H04L 63/0227 726/13 |
| 2014/0052836 | A1* | 2/2014 | Nguyen | H04L 47/2475 709/223 |
| 2014/0153435 | A1* | 6/2014 | Rolette | H04L 41/5054 370/252 |
| 2015/0016255 | A1* | 1/2015 | Bisht | H04L 47/11 370/235 |

FOREIGN PATENT DOCUMENTS

JP            4955722 B2    6/2012

* cited by examiner

*Primary Examiner* — Duyen M Doan
(74) *Attorney, Agent, or Firm* — Slater Matsil, LLP

(57) ABSTRACT

A packet capture system for capturing packets flowing in a capture target network, and a plurality of stages of packet distribution devices for capturing packet of a specific flow are cascade-connected, packet distribution devices identify a capture target flow by analyzing inputted packets, packet distribution devices other than a last-stage packet distribution device are configured to distribute packets to capture packets of a flow to be captured and output packets of a flow not to be captured to a next-stage packet distribution device, and the last-stage packet distribution device is configured to filter the packets of the flow to be captured and to discard the packets of the flow not to be captured.

10 Claims, 16 Drawing Sheets

PACKET CAPTURE SYSTEM, METHOD AND PROGRAM

CROSS-REFERENCE TO RELATED APPLICATIONS

This application is a national phase entry of PCT Application No. PCT/JP2020/045811, filed on Dec. 9, 2020, which application is hereby incorporated herein by reference.

TECHNICAL FIELD

The present invention relates to a packet capture technique for capturing packets in a network.

BACKGROUND

With the development of virtualization technology in NFV (Network Functions Virtualization)/SDN (Software Defined Networking), various services using VM (Virtual Machine, etc.) are provided, and the network is large-scaled and complicated. A packet capture device capable of selectively capturing a packet of specific flow (an aggregation of packets having the same rule for a combination of MAC address and IP address of the transmission source and destination and the like) is one of devices essential for fault analysis of the network. In the large-scaled and complicated network, it is necessary to capture an ultra-large amount of packets such as several hundreds of thousands of flows.

FIG. 16 shows a configuration diagram a conventional packet capture device (PTL 1). The conventional packet capture device includes a packet analysis unit for analyzing a header of an input packet, and a flow identification unit for specifying the flow registered in a rule table. In a filter unit, the flow packet not corresponding by the flow identification unit is discarded, the corresponding flow is outputted to a capture file generation unit, a plurality of packets are aggregated together with time information and converted into a capture file, and stored in a storage unit.

CITATION LIST

Patent Literature

PTL 1-Japanese Patent No. 4955722

SUMMARY

Technical Problem

In the configuration of the conventional device, since the number of rules that can be registered in the rule table is limited by maximum memory capacity mounted on the device, it is difficult to capture the ultra-large amount of packets. In addition, even if the number of registerable rules can be increased by devising a memory configuration inside the device, the number of request rules greatly differs depending on the network in which the packet capture device is installed. Therefore, there is a possibility that a redesign of the device may occur depending on the installation destination network, and the conventional configuration is not configured in consideration of scalability.

Further, although it is conceivable to extend the number of registration rules by processing in parallel using a plurality of the devices, since a high-speed switch for copying and distributing input packets is required between the capture target NW and the parallel device group, the number of the devices is increased and the system becomes expensive. Instead of the high-speed switch, connection via an optical splitter may be considered, but the number of parallel lines is limited due to a branch loss. That is, it is difficult to realize a packet capture device and system capable of increasing the number of registration rules at a low cost.

Embodiments of the present invention have been made to solve the above problem, and an object of embodiments of the present invention is to realize a packet capture system in which scalability is taken into consideration while minimizing the number of constituent devices without limiting the number of rules capable of capturing.

Solution to Problem

In order to solve the above problem, a packet capture system according to embodiments of the present invention is a packet capture system for capturing packets flowing through a capture target network, has a configuration in which a plurality of stages of packet distribution devices for capturing packets of a specific flow are cascade-connected, and each of the plurality of stages of packet distribution devices includes a packet analysis unit for analyzing inputted packets, a flow identification unit for identifying a flow to be captured, packet distribution devices other than a last-stage packet distribution device of the plurality of stages of packet distribution devices include a distribution unit for distributing packets to capture the packets of the flow to be captured, and the distribution unit is configured to output the packets of the flow not to be captured to a next-stage packet distribution device, and the last-stage packet distribution device includes a filter unit for filtering the packets in order to capture the packets of the flow to be captured, and the filter unit is configured to discard the packets of the flow not to be captured.

In order to solve the above problem, a packet capture system according to embodiments of the present invention is a packet capture system for capturing packets flowing through a capture target network, includes a configuration in which a plurality of stages of packet distribution devices for distributing packets of a specific flow are cascade-connected, a switch for collecting outputs of the plurality of stages of packet distribution devices, and a processing device for capturing the packets outputted by the switch, and each of the plurality of stages of packet distribution devices includes a packet analysis unit for analyzing inputted packets, a flow identification unit for identifying a flow to be captured, and a distribution unit for distributing packets of the flow to be captured and packets not to be captured, and distribution units of the packet distribution devices other than a last-stage packet distribution device of the plurality of stages of packet distribution device is configured to transmit the packets of the flow to be captured to the switch and output the packets of the flow not to be captured to a next-stage packet distribution device, and the distribution unit of the last-stage packet distribution device is configured to transmit the packets of the flow to be captured to the switch and discard the packets of the flow not to be captured.

In order to solve the above problem, a packet capture system according to embodiments of the present invention is a packet capture system for capturing packets flowing through a capture target network, includes a configuration in which a plurality of stages of packet distribution devices for distributing packets of a specific flow are cascade-connected, and a processing device for capturing packets outputted by a first-stage packet distribution device of the plurality of the packet distribution devices, and each of the plurality of stages of packet distribution devices includes a packet analysis unit for analyzing inputted packets, a flow identification unit for identifying a flow to be captured, and a distribution unit for distributing the packets of the flow to be captured and the packets not to be captured, and the first-stage packet distribution device is configured to output the packets of the flow not to be captured to a next-stage packet distribution device, and transmits the packets of the flow to be captured and packets transmitted from the next-stage packet distribution device to the processing device, a last-stage packet distribution device of the plurality of stages of packet distribution devices is configured to transmit the packets of the flow to be captured to a preceding-stage packet distribution device, and to discard packets of the flow not to be captured, and when a middle packet distribution device is connected between the first-stage packet distribution device and the last-stage packet distribution device, the middle packet distribution device is configured to output the packets of the flow not to be captured to the next-stage packet distribution device, and transmit the packets of the flow to be captured and the packet transmitted from the next-stage packet distribution device to the preceding-stage packet distribution device.

In order to solve the above problem, a packet capture method according to embodiments of the present invention is a packet capture method in a packet capture system including a configuration in which a plurality of stages of packet distribution devices for capturing packets of a specific flow are cascade-connected and captures packets flowing through a capture target network, and includes a step, by each of the plurality of stages of packet distribution devices, for analyzing inputted packets and identifying a flow to be captured, a step, by a packet distribution device other than a last-stage packet distribution device of the plurality of stages of packet distribution devices, for distributing packets to capture packets of the flow to be captured and outputting packets of the flow not to be captured to a next-stage packet distribution device, and a step, by a last-stage packet distribution device, for filtering packets to capture the packets of the flow to be captured and discarding the packets of the flow not to be captured.

In order to solve the above problem, a traffic monitor program of embodiments of the present invention causes a computer to execute each step of the packet capture method, and causes the computer to operate as the packet capture system.

Advantageous Effects of Embodiments of Invention

According to embodiments of the present invention, it is possible to realize a packet capture system in which scalability is taken into consideration while minimizing the number of constituent devices without limiting the number of rules capable of capturing.

DETAILED DESCRIPTION OF ILLUSTRATIVE EMBODIMENTS

Embodiments of the present invention will be described below in detail with reference to the Figures. The present invention is not limited to the embodiments described below.

First Embodiment

Figure 1:
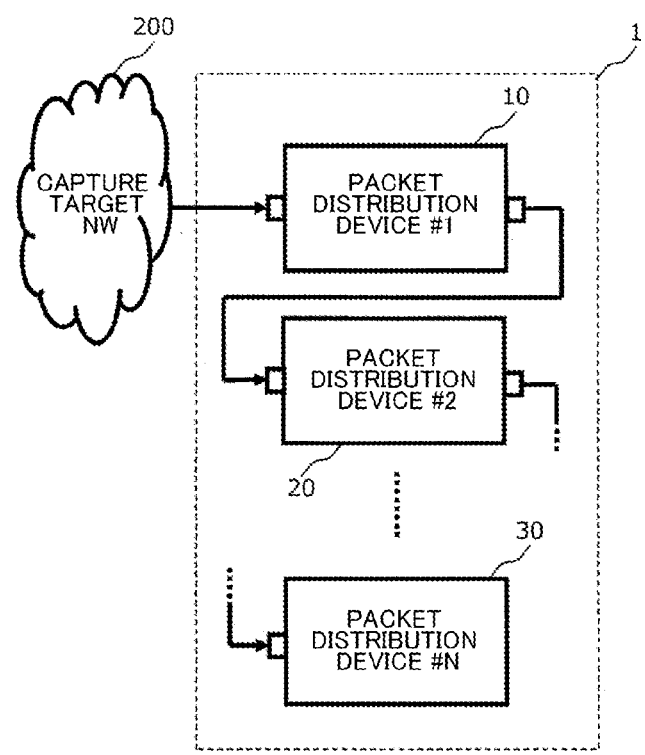
FIG. 1 is a diagram showing a configuration example of a packet capture system according to a first embodiment of the present invention.
Figure 2:
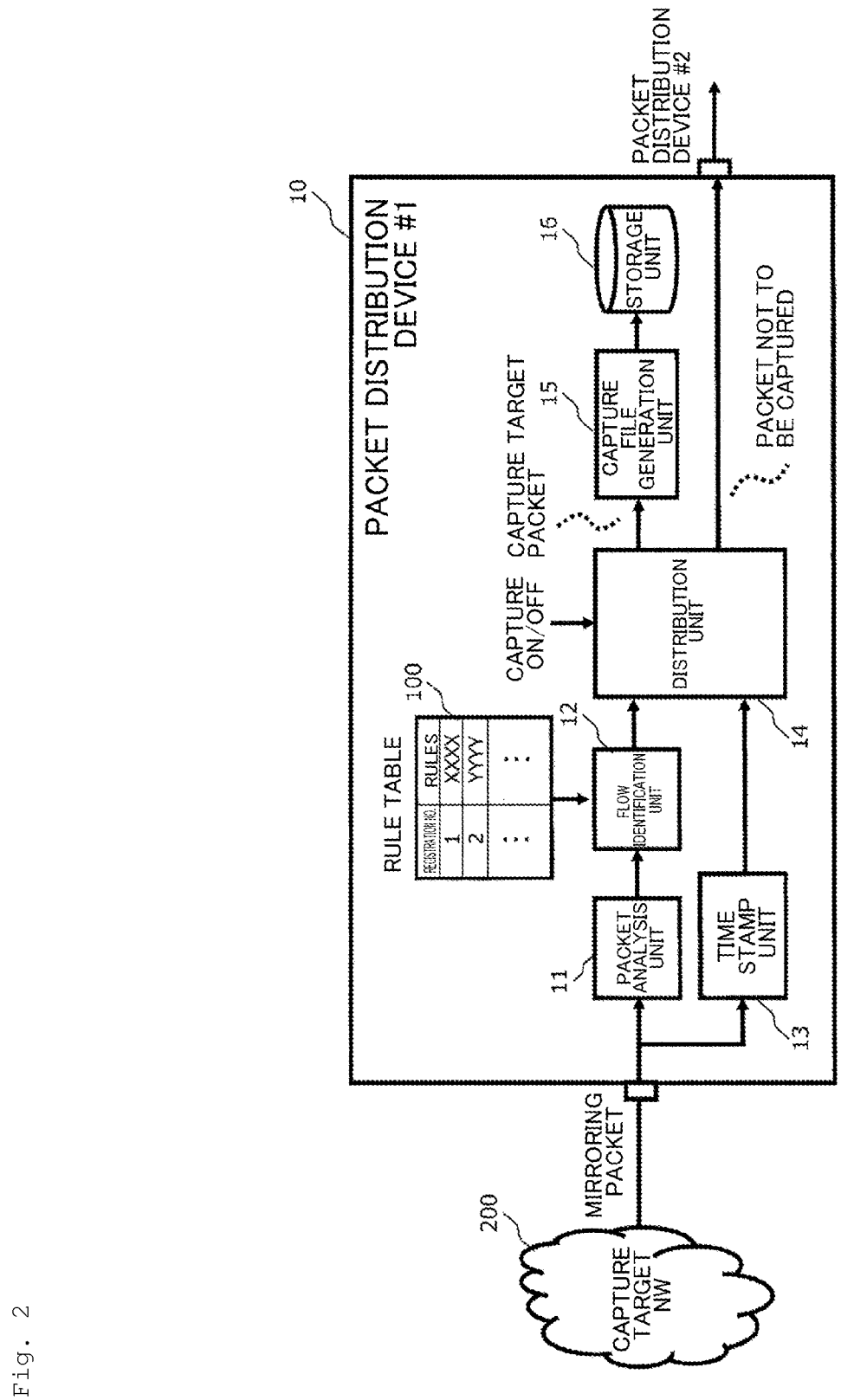
FIG. 2 is a diagram showing a configuration example of a packet distribution device according to the first embodiment of the present invention.

Next, a first embodiment of the present invention is described. FIG. 1 is a configuration example of a packet capture system according to the first embodiment of the present invention. FIG. 2 is a configuration example a first-stage packet distribution device of the packet capture system.

Configuration of Packet Capture System

As shown in FIG. 1, the packet capture system 1 is a packet capture system for capturing packets flowing through a capture target network 200. In the packet capture system 1, a plurality of stages (N stages: N is an integer of 2 or more) of the packet distribution devices (10, 20, and 30) are cascade-connected. In the following description, a first-stage packet distribution device 10 of the N pieces of packet distribution devices is referred to as "a first-stage packet distribution device", a n-th stage packet distribution device 3o is referred to as "a last-stage packet distribution device", and a second-stage to N-1-th stage packet distribution device 20 stage are referred to as "middle-stage packet distribution device", respectively. In the case of N=2, the "first-stage packet distribution device" and the "last-stage packet distribution device" are connected.

A packet distribution device other than the last-stage packet distribution device, that is, the first-stage packet distribution device and the middle-stage packet distribution device, captures packets of a specific flow to be captured, transmits packet of a flow not to be captured to a next-stage packet capture, a next-stage distribution device is configured to perform similar processing on the basis of the rule for specifying the flow to be captured. The last-stage packet distribution device is configured to capture packets of a specific flow to be captured and discard packets of a flow not to be captured.

Configuration of First-Stage Packet Distribution Device

FIG. 2 is a configuration example of a first-stage packet distribution device 10 of the packet capture system 1. The first-stage packet distribution device 10 includes a packet analysis unit 11 for receiving mirroring packets from a capture target network 200 and performing header analysis of the packets, a flow identification unit 12 for comparing a header extracted by a header analysis with a rule in a rule table 100 to identify a flow to be captured, a distribution unit 14 for distributing packets of a flow to be captured and packets of a flow not to be captured on the basis of the flow identification result by the flow identification unit 12, a capture file generation unit 15 for generating a capture file for the packets of the flow to be captured, and a storage unit 16 for storing the capture file.

The first-stage packet distribution device 10 has a time stamp unit 13 in front of the distribution unit 14, and an output path from the distribution unit 14 to the next-stage packet distribution device is different from the conventional packet distribution device in terms of configuration. The time stamp unit 13 is provided for unifying packet arrival times in a plurality of packet distribution devices. In the time stamp unit 13, a packet arrival time point is given to a header or the like of a packet, and the capture file is generated in the capture file generation unit 15 by using the given time point information. The packet arrival time point given to the packet is used for processing such as rearrangement of the packet when statistically analyzing the captured packet.

The flow identification unit 12 of the packet distribution device 10 identifies a flow to be captured on the basis of the rule table 100 (the number of rules: Nf) in which a flow to be captured is registered. The packets of capture ON and the flow coincident with the rule in the distribution unit are outputted to the capture file generation unit and are captured by the packet distribution device. In the case of capture OFF, the packet is discarded by the distribution unit. Capture ON/OFF is configured to be able to be set from the outside of the distribution unit. The same applies to the middle-stage packet distribution device 20 and the last-stage packet distribution device 30. Each packet distribution device includes a rule table in which different flows are registered.

In the rule table 100, for example, header field information of a transmission source/destination MAC address and a transmission source/destination IP address can be registered as the rule for identifying the flow. The information for identifying the flow is not limited to them, and a combination of header field information such as a transmission source/destination port number and a protocol type may be registered as a rule for identifying the flow.

The capture file is generated for the packet of the flow to be captured in which header information extracted by header analysis of the packet coincides with the rule of the rule table, and the generated capture file is stored in the storage unit 16. The packet of the flow whose header information does not match the rule of the rule table is distributed to an output path to a next-stage packet distribution device in the distribution unit 14 and outputted to the next-stage packet distribution device. By repeating this processing for N sets, packet capture processing of the ultra-large flow number (N×Nf) can be realized.

Configuration of Middle-Stage Packet Distribution Device

Figure 3:
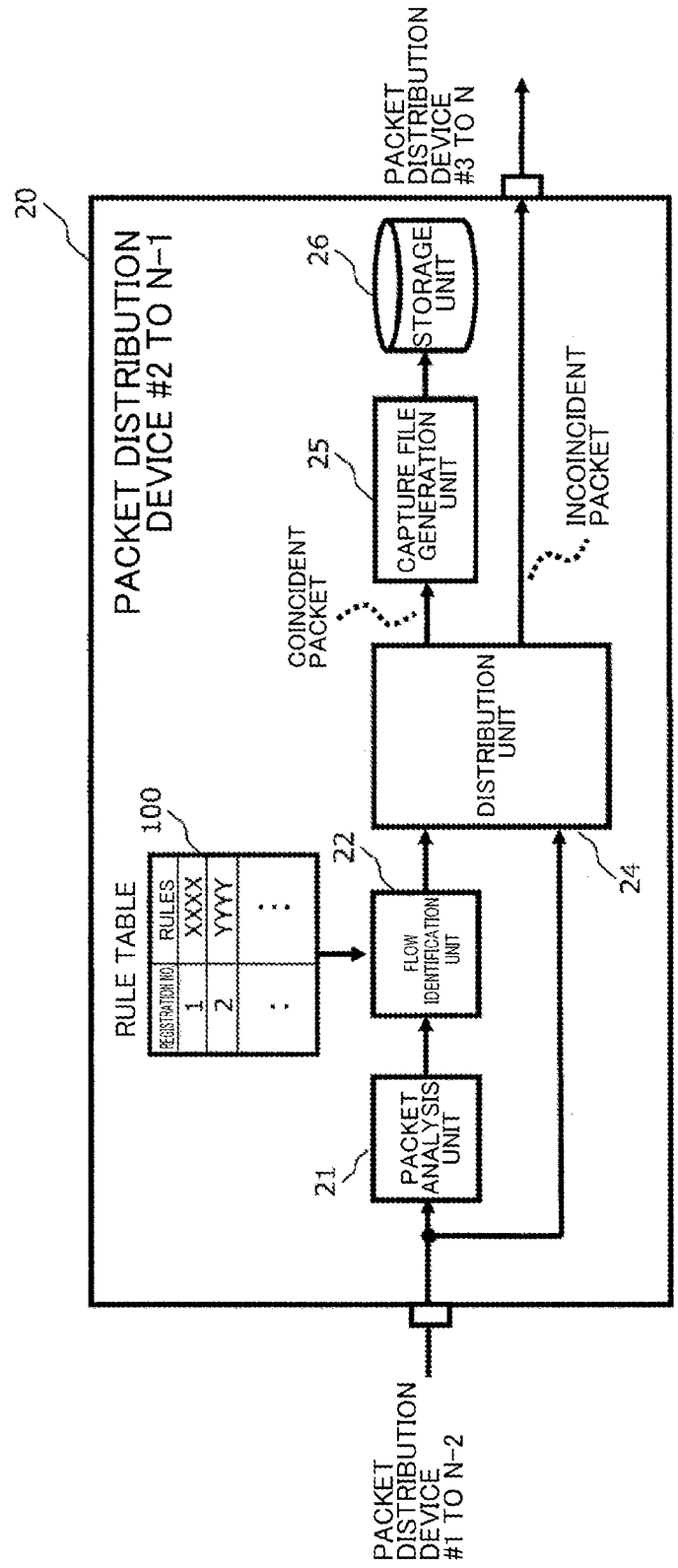
FIG. 3 is a diagram showing a configuration example of a packet distribution device according to the first embodiment of the present invention.

FIG. 3 is a configuration example of the middle-stage packet distribution device 20 (#2 to #N-1). Similarly to the first-stage packet distribution device 10, a packet analysis unit 21, a flow identification unit 22, a distribution unit 24, a capture file generation unit 25, a storage unit 26 and the rule table 100 are provided. This is different from the first-stage packet distribution device 10 in that there is no time stamp unit. In the capture file generation unit 25 of the middle-stage packet distribution device 20, the capture file is generated by using time point information given by the time stamp unit 13 of the first-stage packet distribution device 10.

Configuration of Last-Stage Packet Distribution Device

Figure 4:
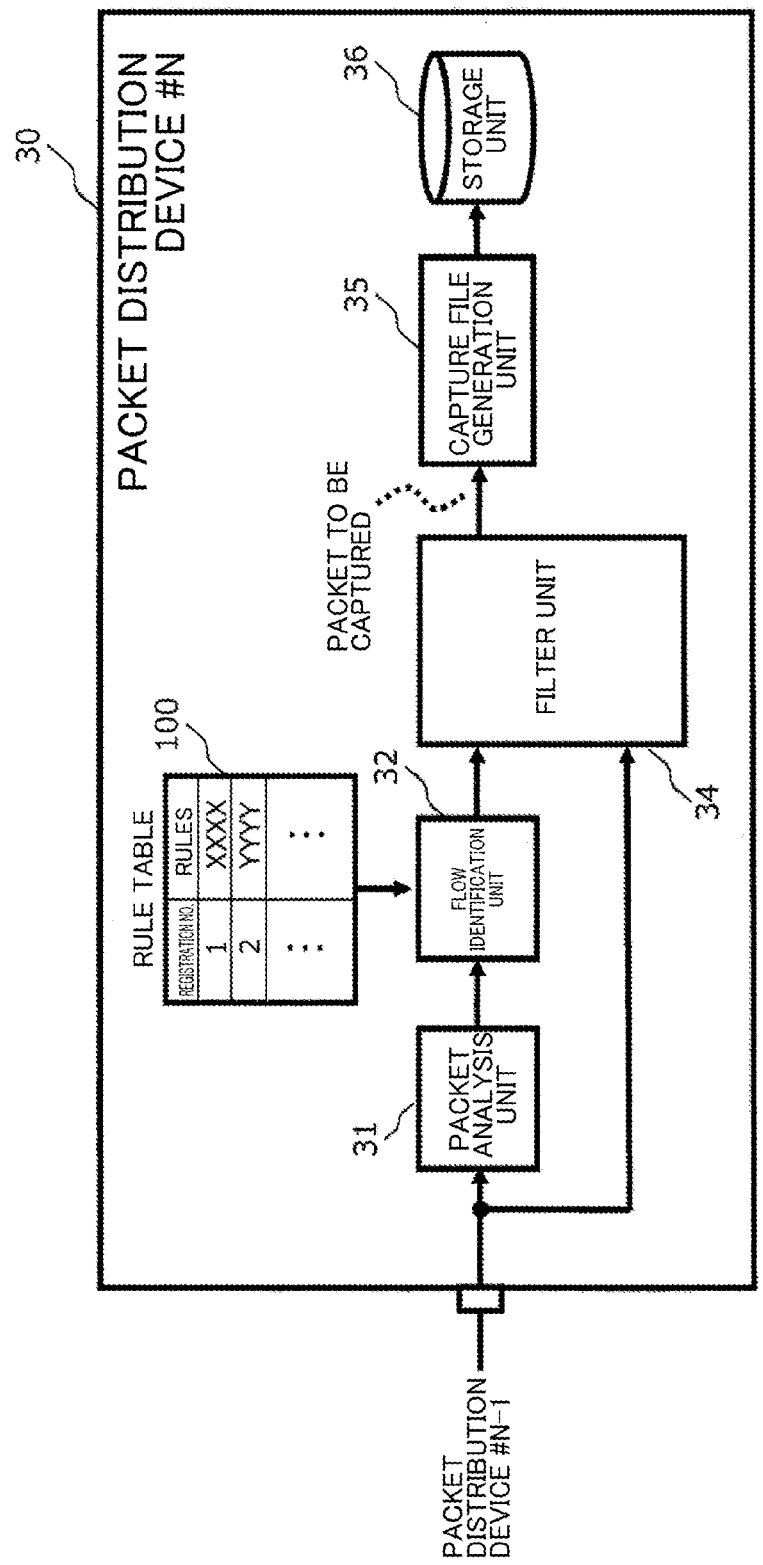
FIG. 4 is a diagram showing a configuration example of a packet distribution device according to the first embodiment of the present invention.

FIG. 4 shows a configuration example of the packet distribution device #N which is the last stage of the cascade-connection. Similarly to the first-stage packet distribution device (#1), the middle-stage packet distribution device 20 (#2 to #N-1), a packet analysis unit 31, a flow identification unit 32, a capture file generation unit 35, and a storage unit 36 are provided. The difference from the middle-stage packet distribution device 20 is that there is no output path to the next stage packet distribution device and that the distribution unit 24 is changed to a filter unit 34.

Since the last-stage packet distribution device 3*o* (#N) becomes a terminal device of the packet capture processing, the flow which does not coincide with the rule table 100 is discarded by filtering of the filter unit 34. The packets of the flow coincident with the rule are outputted to the capture file generation unit 35 in the same way as the device up to the packet distribution device #N-1, and the generated capture file is stored in the storage unit 36.

Although, in the present embodiment, the configuration in which a packet distribution function is operated only by the packet distribution device has been described as an example, for example, the packet distribution function may be operated as one function of a traffic monitor device which also performs statistical information processing. In this case, in order to identify the flow to be captured from the flow of an statistical information acquisition target, for example, a "capture flag" indicating whether or not the flow is to be captured may be provided in a rule table for identifying the flow of the statistical information acquisition target.

The packets of the flow coincident with the rule of the statistical information acquisition target are set as the statistical information acquisition target, and the statistical information of the flow is aggregated by another function unit. On the other hand, the packets of the flow which do not coincide with the rule of the statistical information acquisition target is output to the next-stage packet distribution device. The packets of the flow that coincides with the rule of the statistical information acquisition target and satisfies "capture flag"=1 are outputted to the capture file generation unit, and the packets that coincides with the rule of the statistical information acquisition target and satisfies "capture flag"=0 are discarded as packets not to be captured.

As described above, in the first embodiment, the N-stage packet distribution devices are cascade-connected, and the number of flows that can be captured can be freely increased or decreased according to the number of connection stages. With such a configuration, when the number of flows that can be captured by the one-stage packet distribution device (the number of rules that can be registered) is defined as Nf (Nf is an integer greater than 1), the packet capture of N×Nf flows is possible in the entire system. By increasing the number of stages of the packet distribution device and the number of rules, the ultra-large amount of packets can be captured, and the number of flows that can be captured in a scalable manner can be changed according to the size of the capture target network.

Operation of Packet Capture Method

Figure 5:
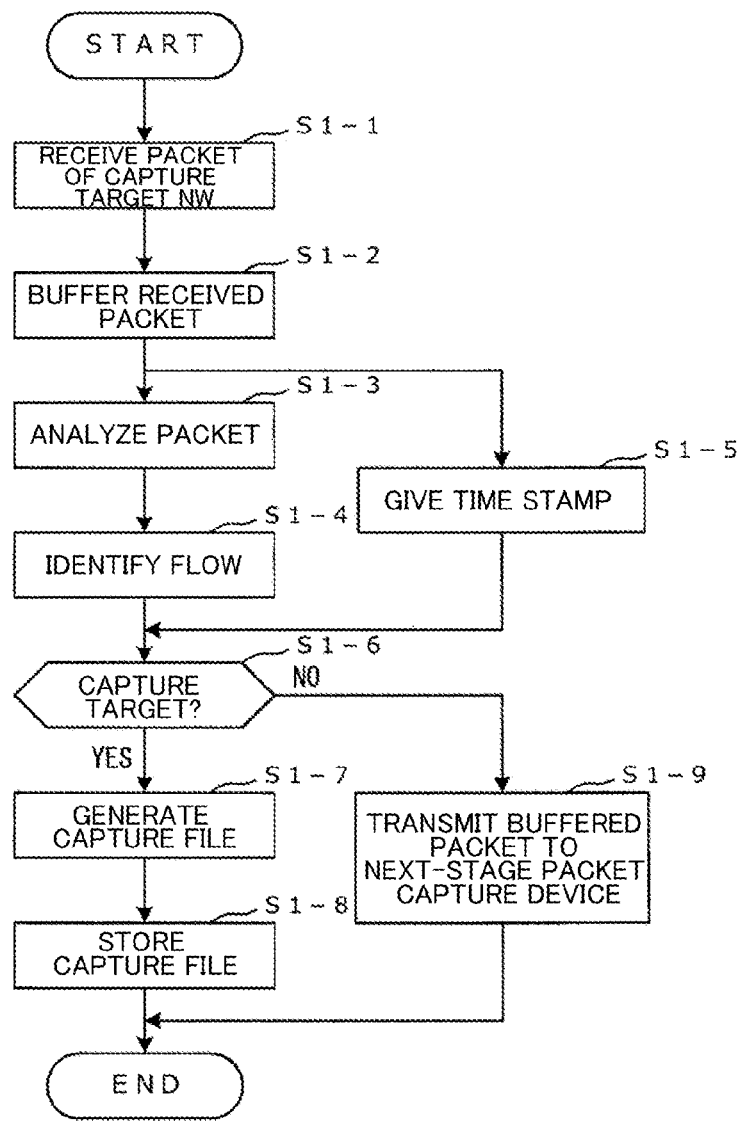
FIG. 5 is a flowchart showing an operation procedure in a first-stage packet distribution device according to the first embodiment of the present invention.
Figure 6:
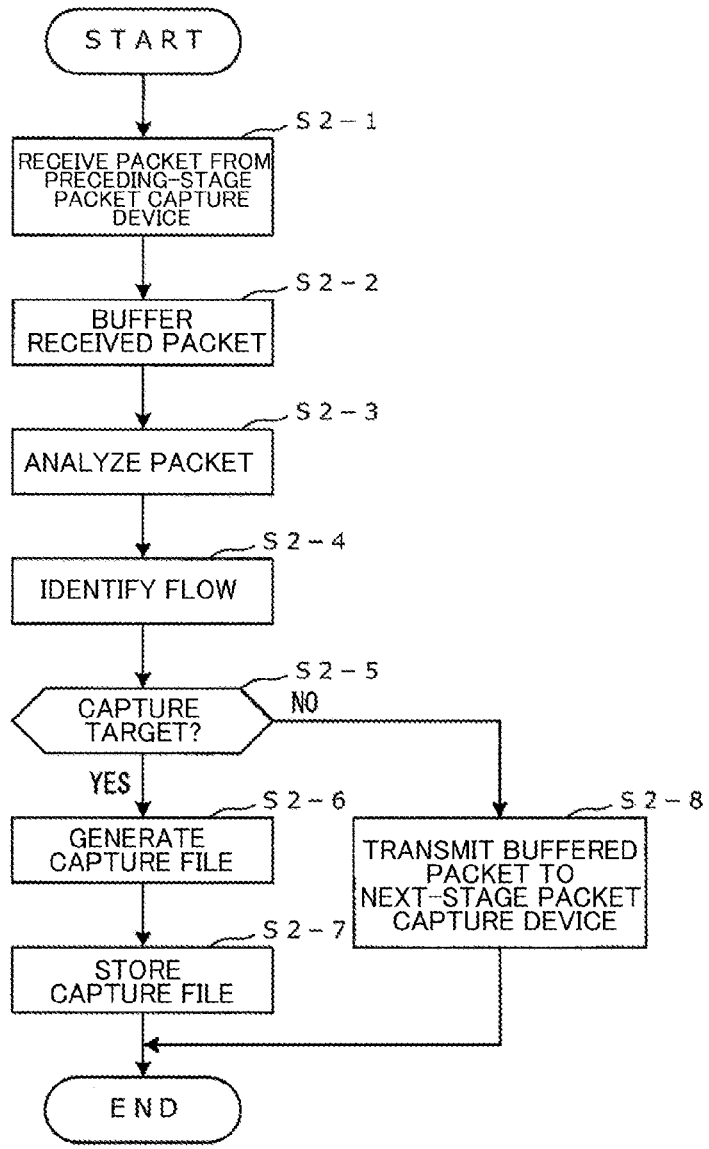
FIG. 6 is a flowchart showing an operation procedure in a middle-stage packet distribution device according to the first embodiment of the present invention.
Figure 7:
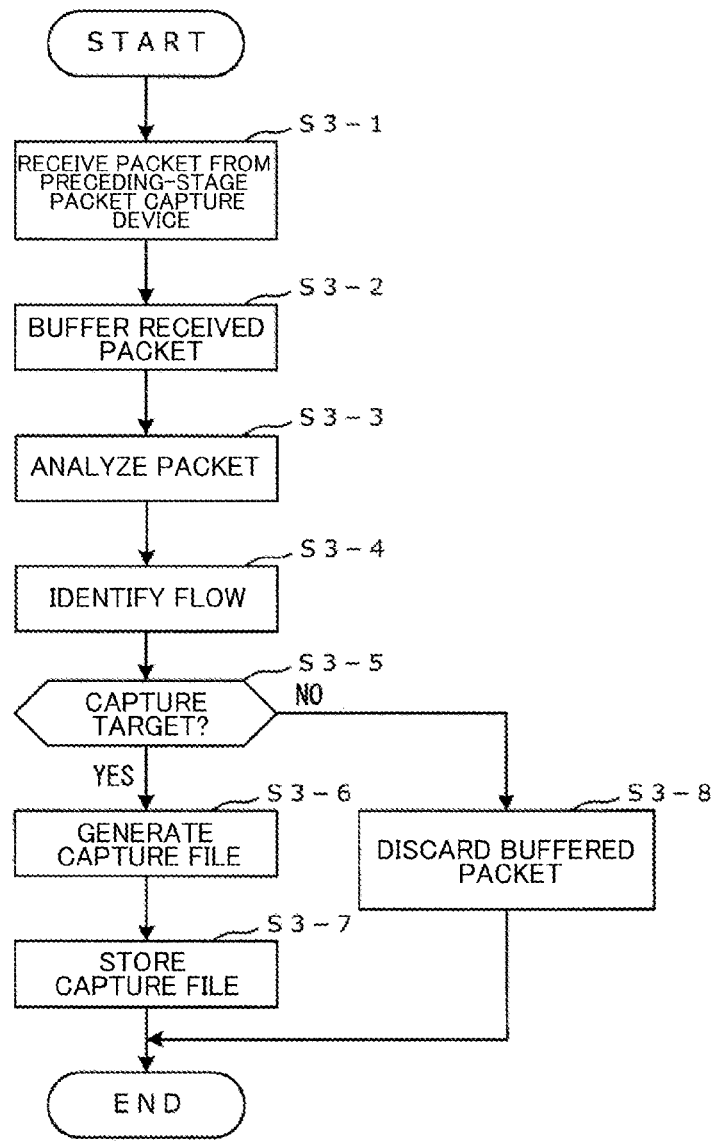
FIG. 7 is a flowchart showing an operation procedure in a last-stage packet distribution device according to the first embodiment of the present invention.

The operation of the packet capture method according to the first embodiment will be described with reference to FIGS. 5, 6 and 7. FIG. 5 is a flowchart showing an operation procedure of the first-stage packet distribution device. FIG. 6 is a flowchart showing an operation procedure of the middle-stage packet distribution device. FIG. 7 is a flowchart showing an operation procedure of the last-stage packet distribution device.

Operation of First-Stage Packet Distribution Device

In FIG. 5, when receiving packets from the capture target network 200 (step S1-1), the first-stage packet distribution device buffers the received packets (step S1-2), and performs a header analysis of the packets to extract header information (step S1-3). Here, in parallel with the packet analysis, the time stamps being arrival time information are given to the buffered packets (step S1-5).

Next, the header extracted by the header analysis is compared with the rule of the rule table to identify whether or not the flow is a flow to be captured (step S1-4). When the flow coincides with the rule (step S1-6: YES), the capture file is generated (step S1-7), and the generated capture file is stored in the storage unit (step S1-8). When the flow does not coincide with the rule recorded in the rule table (step S1-6: NO), the buffered packets are transmitted to the next-stage packet distribution device (step S1-9).

Operation of Middle-Stage Packet Distribution Device

In FIG. 6, the operation of the middle-stage packet distribution device is different from that of the first-stage packet distribution device of FIG. 5 in that there is no point (step S2-1) for receiving packets from the preceding-stage packet device and no step for giving the time stamp. The middle-stage packet distribution device performs the packet analysis on packets received from the preceding-stage packet device, generates the capture file and stores it in the storage unit in the case of packets of the flow to be captured (step S2-6, S2-7), and in the case of packets of the flow not to be captured, the packets are transmitted to the next-stage packet distribution device (step S2-8).

Operation of Last-Stage Packet Distribution Device

In FIG. 7, the operation of the last-stage packet distribution device is different from that of the middle-stage packet distribution device in FIG. 6 in a point in which the packets of the flow not to be captured are discarded (step S3-8). The last-stage packet distribution device generates the capture file and stores it in the storage unit in the case where the received packets from the preceding-stage packet device are packets of the flow to be captured (step S3-6, S3-7), and in the case of packets of the flow not to be captured, the packets are discarded (step S3-8).

Configuration Example of Packet Distribution Device

Although the plurality of packet distribution devices in the present embodiment may be realized in physically different device configurations, they are not limited thereto. For example, it may be realized by a board on a server or by software operating on a computer to realize the function of the packet distribution device.

Figure 8:
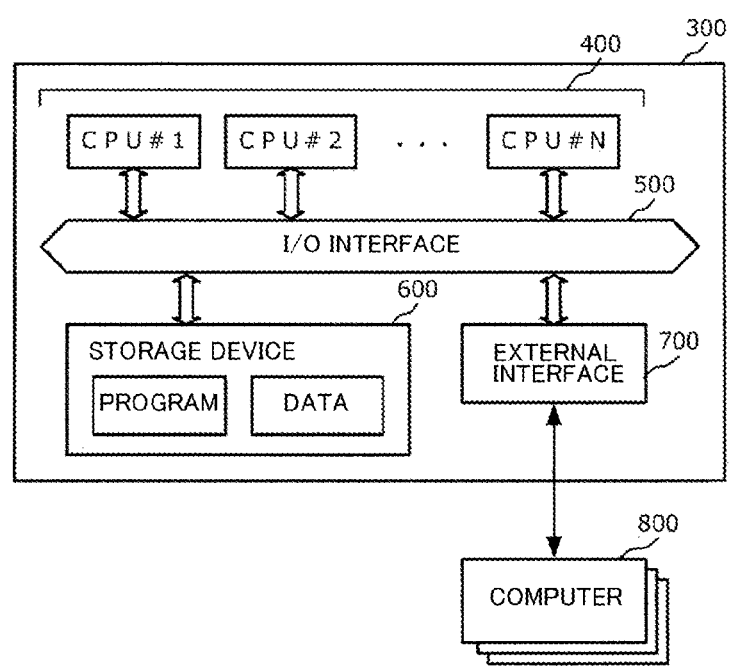
FIG. 8 is a configuration example of a computer for realizing a traffic monitor device according to the present embodiment.

FIG. 8 shows a configuration example of the computer operating as the packet distribution device. Each unit of the packet distribution device configuring the packet capture system on the present embodiment cab be realized by the computer that includes a CPU (Central Processing Unit), a storage device, and an external interface (external I/F below), and furthermore a program for controlling such hardware resources.

A computer 30o is provided with a CPU 400, a storage device 600, and an external I/F 700, and each of them are connected to each other via an I/O interface 500. Data such as packet capture programs and capture files for realizing the operation of the packet capture system of the present embodiment is stored in the storage device 600, and other computers Boo for transmitting and receiving signals and computers constituting a network are connected to the external I/F 700. The CPU 400 can execute the packet capture processing described in the present embodiment according to the processing program or the like stored in the storage device boo. This processing programs can be stored in a computer-readable storage medium, or can be provided via the network.

Second Embodiment

In the first embodiment, a configuration in which a plurality of packet distribution devices are cascade-connected and the captures of the number of rules that can be registered in each of the packet distribution devices can be performed has been described. In such a configuration, in order to perform processing of statistical information of packets or the like, processing for separately aggregating packets captured by the respective packet distribution devices is necessary. In the second embodiment, the system configuration is that a device for aggregating captured packets is installed in a post-stage of the packet distribution device, and the packets captured by each packet distribution device are aggregated and stored in one storage device.

Figure 9:
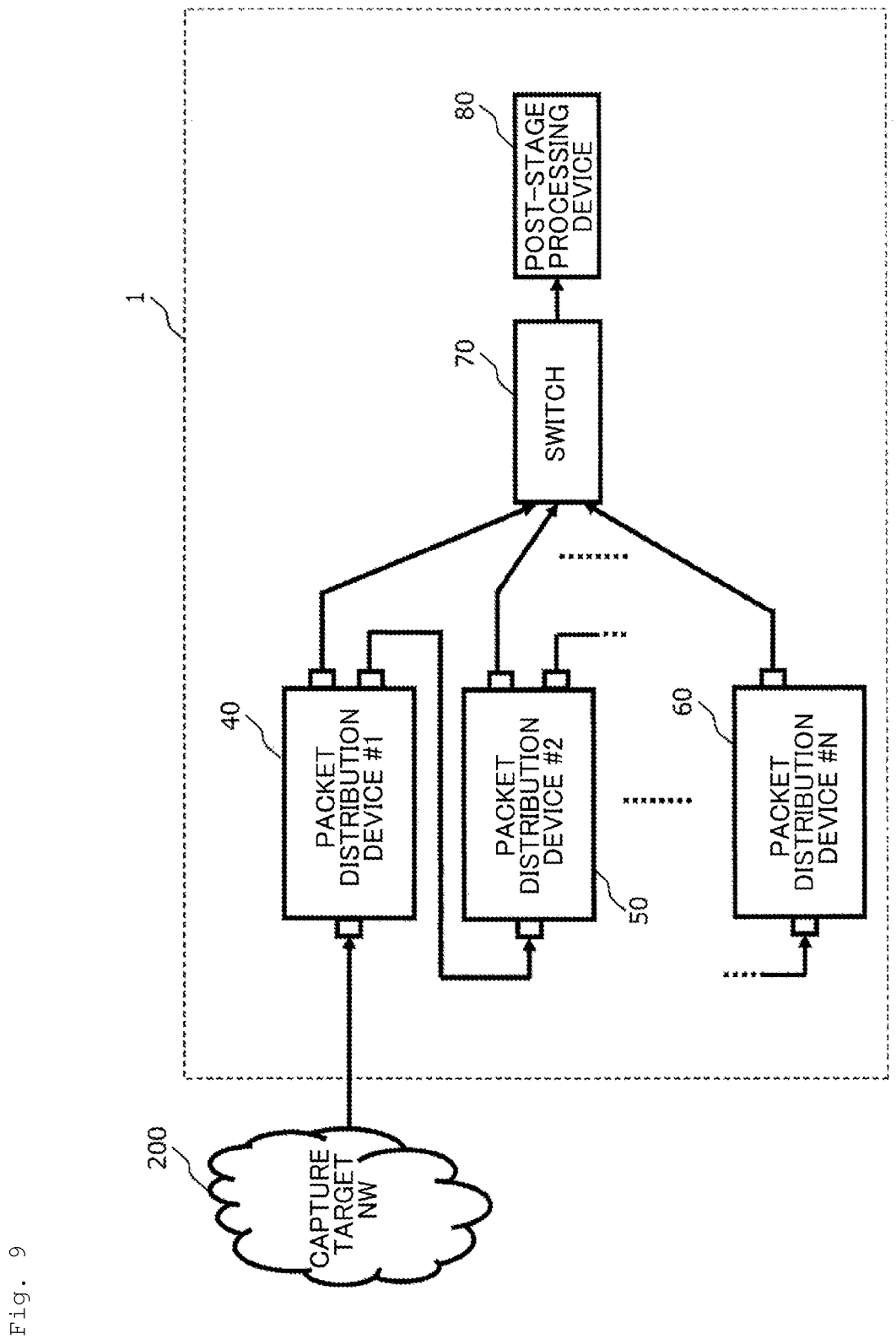
FIG. 9 is a diagram showing a configuration example of a packet capture system according to a second embodiment of the present invention.

FIG. 9 shows a configuration example of a packet capture system according to a second embodiment. The packet capture system 1 of the present embodiment includes a switch connected to N pieces of packet distribution devices (40, 50, and 60) and collects the output of the distribution devices, and a post-stage processing device 80 connected to the switch 70. The switch 70 has a function for switching packets transmitted from the N pieces of packet distribution devices (40, 50, and 60) and transmitting them to the post-stage processing device and can be constituted by general layer 2 and layer 3 switches. The post-stage processing device 80 has a function for collectively converting packets to which at least the arrival time information (the time stamp) are given into the capture file, and a function for storing the capture file.

As the post-stage processing device 80, for example, a traffic visualization device for visualizing the captured packets or a DPI (Deep Packet Inspection) device for analyzing the packets more deeply can be considered, but the present invention is not limited to these devices.

Figure 10:
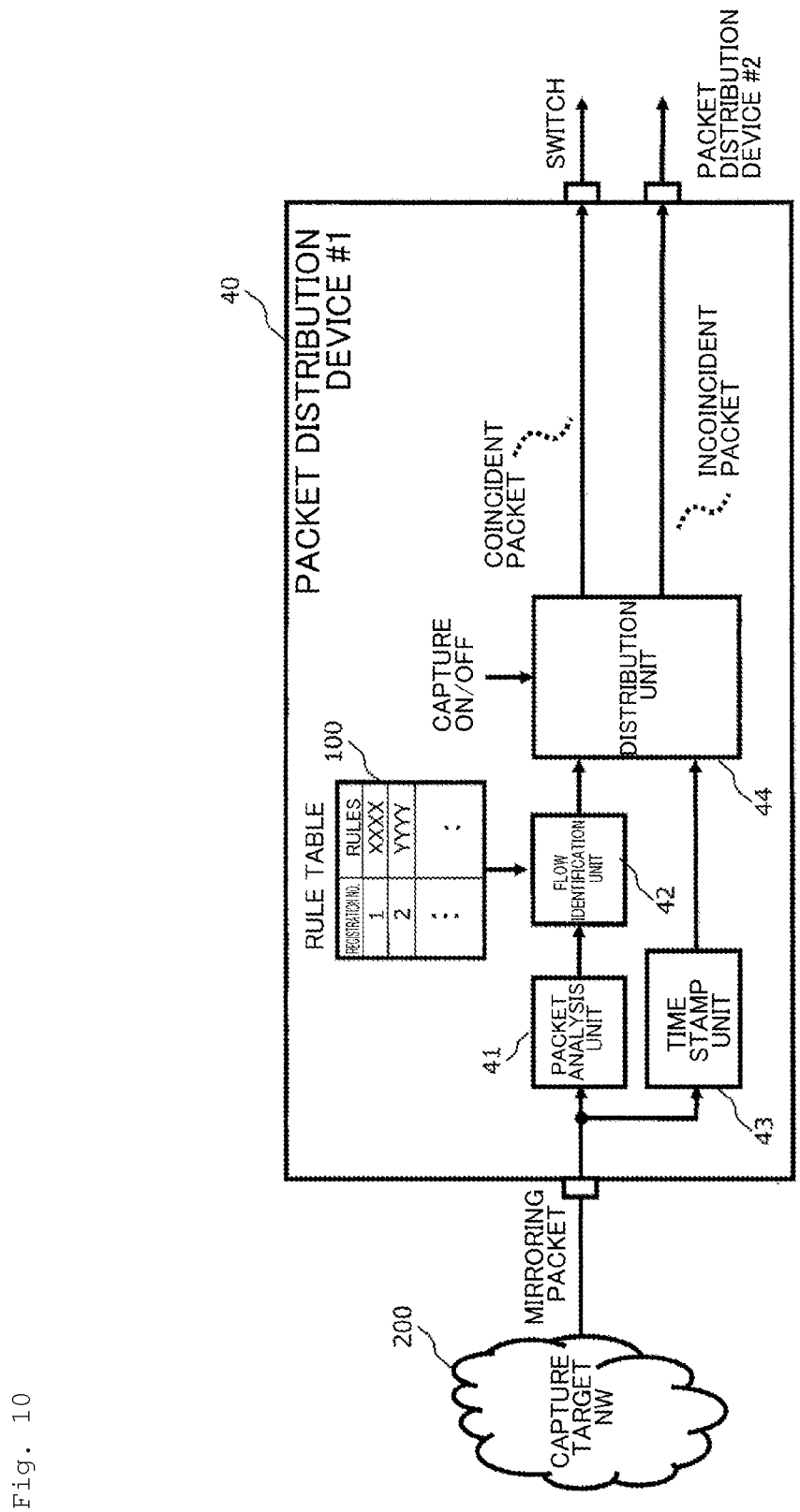
FIG. 10 is a diagram showing a configuration example of a packet distribution device according to the second embodiment of the present invention.

FIG. 10 shows a configuration example of the first-stage packet distribution device 40 (#1) constituting the packet capture system of the present embodiment. The difference from the first-stage packet distribution device 10 in the first embodiment is that there are no capture file generation unit and storage unit, and that the distribution unit 44 is configured so as to output the packets of the flow coincident with the rule of the rule table to the switch 70 in the flow identification unit 42. With such a configuration, each of the packet distribution devices can function as a switch having no function of capturing packets or as a device for distributing packets to the next-stage packet distribution device.

The middle-stage distribution device 50 (#2 to N-1) has the same configuration as the first-stage packet distribution device 40 (#1) except for not having the time stamp unit. When the last-stage packet distribution device 60 (#N), which serves as the terminal device, is compared with the middle-stage packet distribution device 50 (#2 to N-1), a point where the filter unit (not shown) that discards the packets of the flow not to be captured is provided is different.

As described above, according to the second embodiment, the packets of the flow coincident with the rule distributed by the N-stage packet distribution devices (#1 to #N) are aggregated to the post-stage processing device through the switches, and the packet capture at one location can be realized.

Although the present embodiment has shown an example of the configuration in which the captured packet can be stored in one storage device by paying attention to the capture function, the present invention is not limited to this configuration example. For example, the post-stage processing device may be connected to a device other than the distribution device. For example, the post-stage processing device may be connected to the traffic monitor device for receiving mirroring packets and outputting statistical information therefrom.

Third Embodiment

In the second embodiment, a configuration example in which the packet distribution devices #1 to #N are connected the post-stage processing device through the switch to realize the capture system. In such a configuration, there is no cooperation between the devices, and a packet is transmitted in one direction from the packet distribution device to the post-stage processing device. Therefore, in the second embodiment, the start and stop of packet capture are set only in the first-stage packet distribution device #1. In the third embodiment, a configuration example in which the start and stop of packet capture can be set also from the post-stage processing device cooperating with the packet distribution devices #1 to #N is shown.

Figure 11:
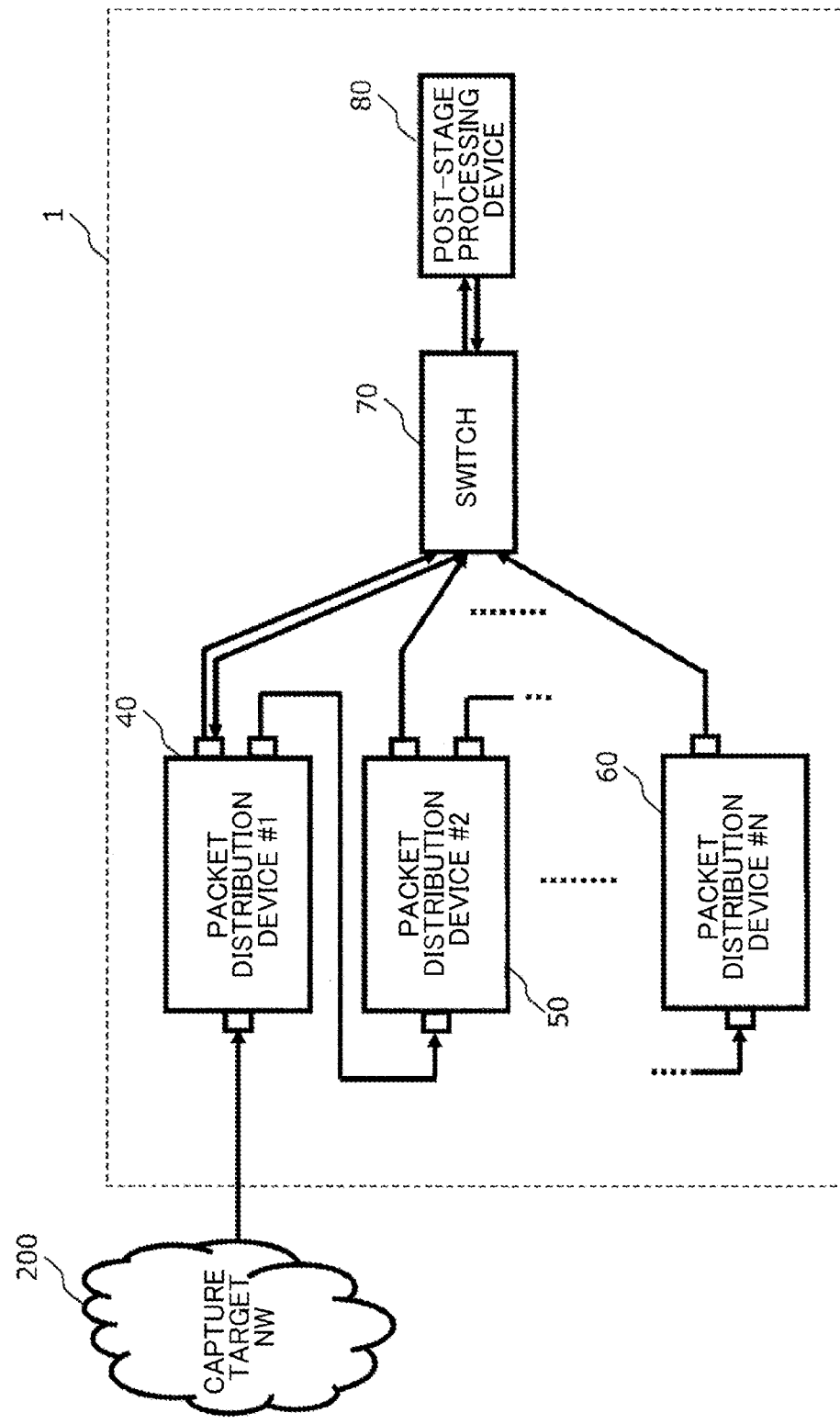
FIG. 11 is a diagram showing a configuration example of a packet capture system according to a third embodiment of the present invention.
Figure 12:
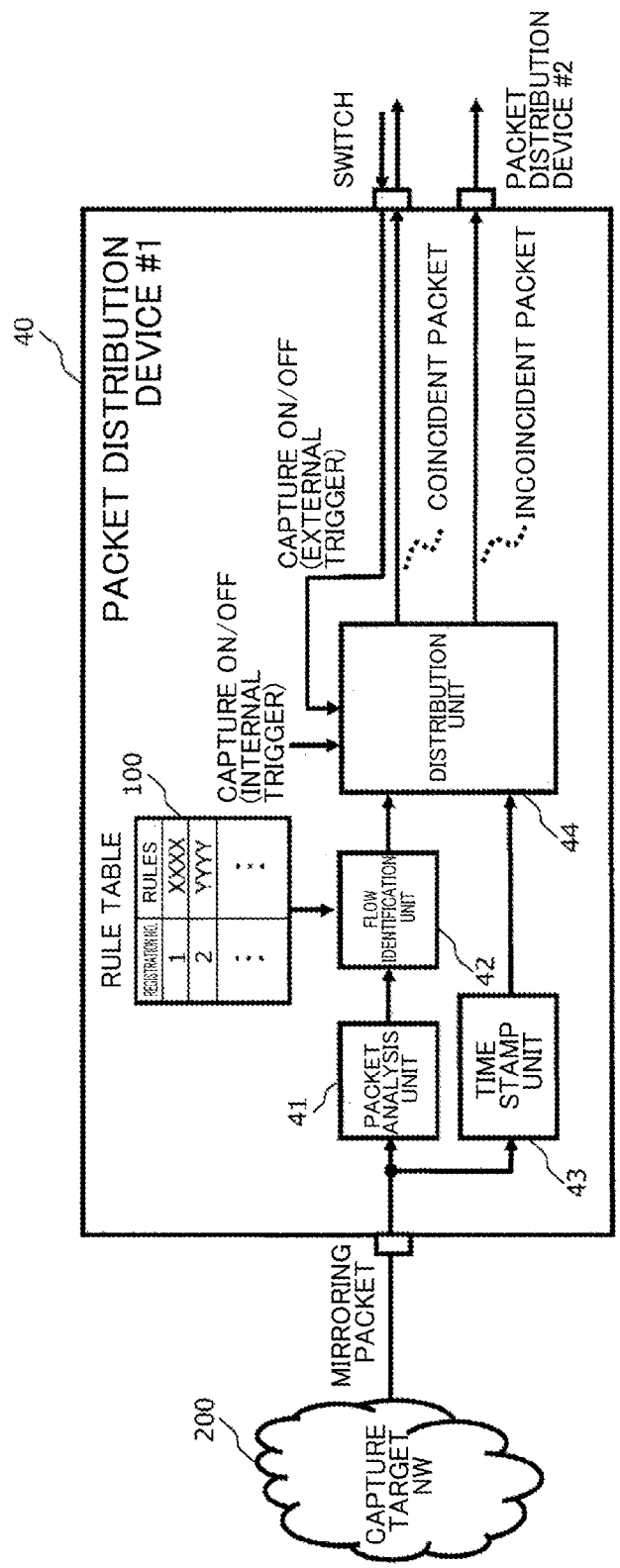
FIG. 12 is a diagram showing a configuration example of a packet distribution device according to the third embodiment of the present invention.

FIG. 11 shows a configuration example of the packet capture system according to the present embodiment, and FIG. 12 shows a configuration example of first-stage packet distribution device #1. As compared with the second embodiment, a point in that an input signal path from the post-stage processing device 80 to the first-stage packet distribution device 40 (#1) via the switch 70 is added is different.

In the present embodiment, the post-stage processing device 80 transmits a packet capture ON/OFF signal, which is a trigger signal, to the first-stage packet distribution device 40 (#1), and the first-stage packet distribution device 40 (#1) judges the start and stop of capture on the basis of the signal. In the case of capture ON, the first-stage packet distribution device 40 (#1) starts to capture the packets in the distribution unit 44, and in the case of capture OFF, the packets are discarded in the distribution unit 44. According to the present embodiment, when it is determined that capture processing is necessary by the post-stage processing device 80, packet capture can be started, and a capture system having higher usability can be realized.

Fourth Embodiment

In the second and third embodiments, a configuration in which the packets to be captured are transmitted to the post-stage processing device via the switch is shown. In such a configuration, when the number of components of the system is increased, there is a case where segmentation and verification when some failure occurs in the system become complicated accordingly. In the fourth embodiment, a configuration example for transmitting capture packets to the post-stage processing device without passing through the switch will be described.

Figure 13:
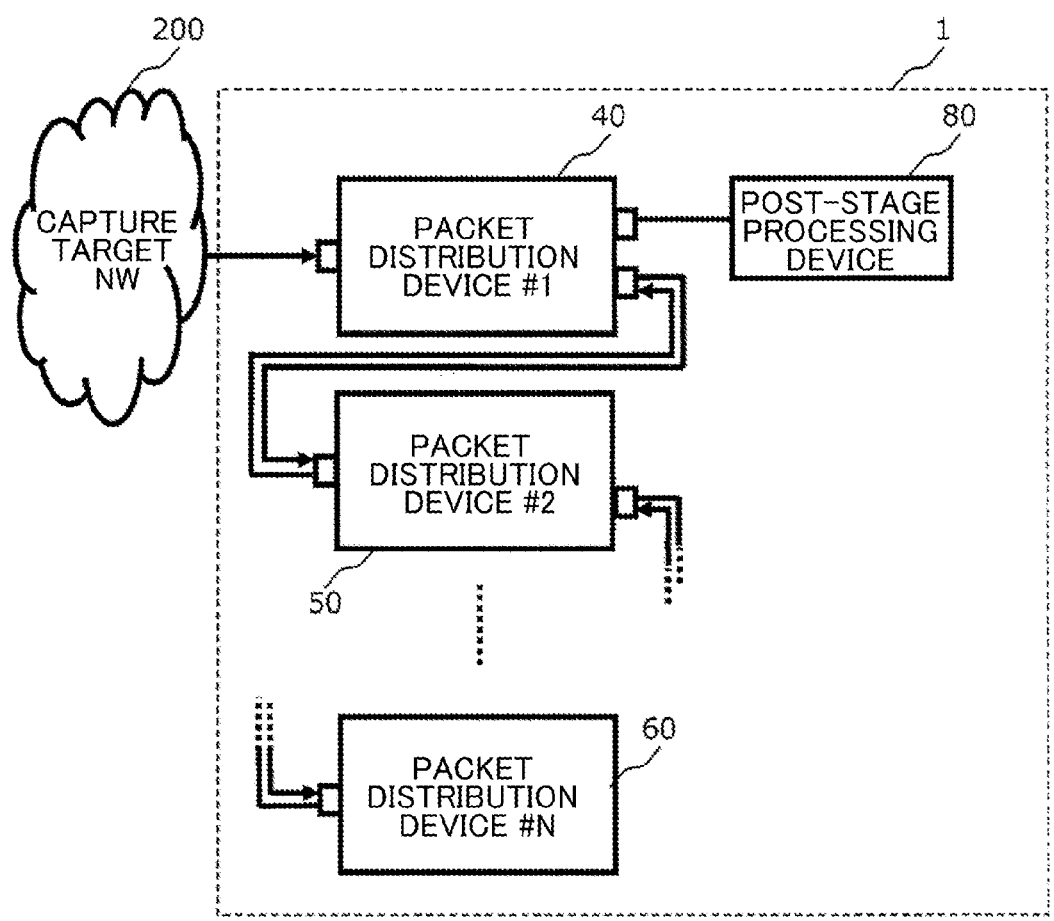
FIG. 13 is a diagram showing a configuration example of a packet capture system according to a fourth embodiment of the present invention.

FIG. 13 shows a configuration example of a packet capture system of the present embodiment. The packet capture system 1 includes N pieces of packet distribution devices (40, 50, and 60) and a post-stage processing device 80 connected only to a first-stage packet distribution device 40. In the present embodiment, it is configured so that the packet judged to be a capture target in the distribution devices #2 to #N is returned from the judged packet distribution device to the preceding-stage packet distribution device, and it is configured so that, finally, all the packets to be captured are returned to the first-stage distribution device 40 (#1). With such a configuration, it is possible to transmit and aggregate the capture target packets to the post-stage processing device 80 without using the switch.

Figure 14:
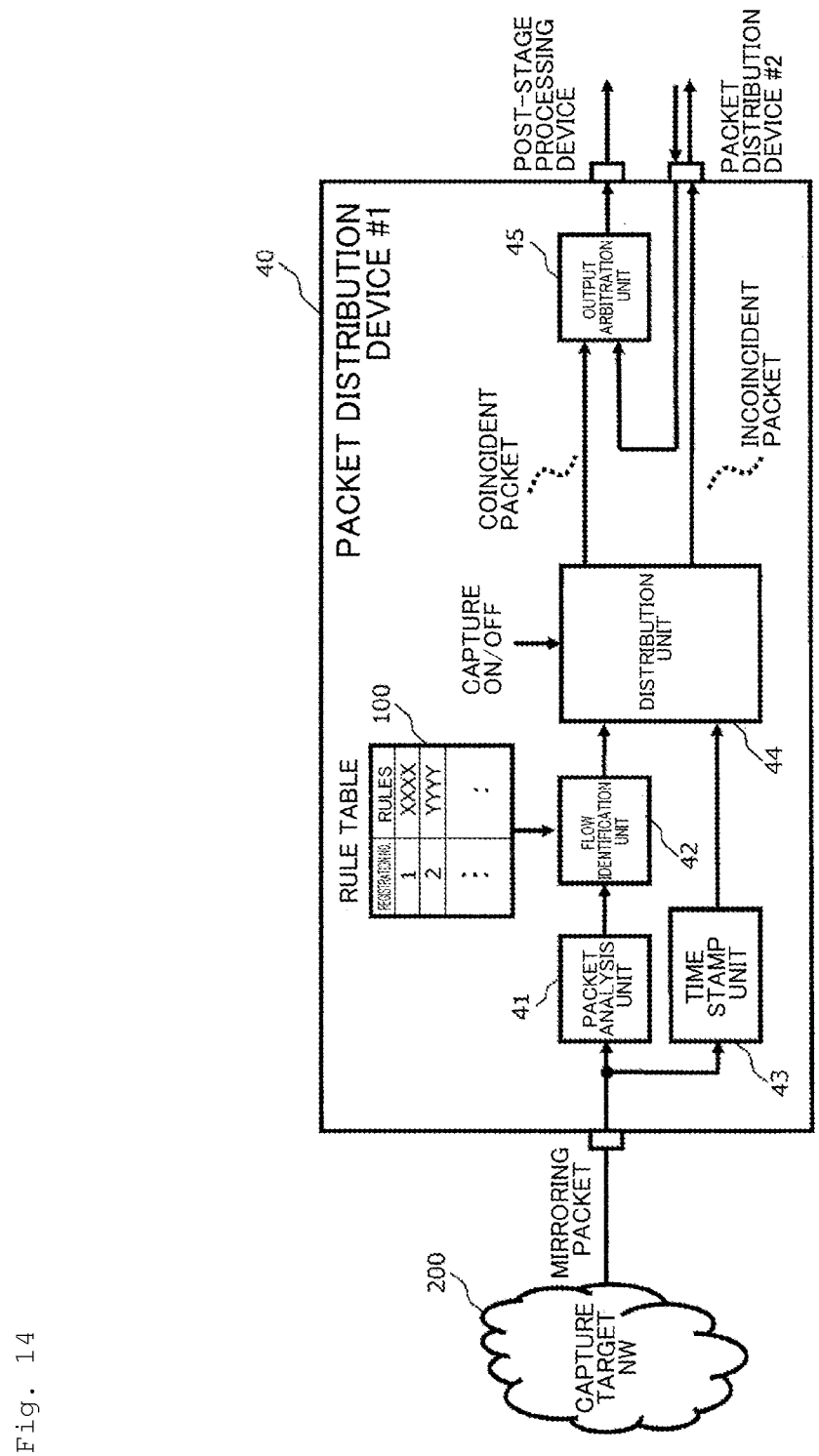
FIG. 14 is a diagram showing a configuration example of a first-stage packet distribution device according to the fourth embodiment of the present invention.

FIG. 14 shows a configuration example of the first-stage packet distribution device 40 (#1). The difference of the first-stage packet distribution device #1 between the present embodiment and the second embodiment is that an output arbitration unit 45 is provided. The packet judged to be a capture target by the flow identification unit 42 and the packet judged to be a capture target by the distribution device #2 to #N are inputted to the output arbitration unit 45. The output arbitration unit has a function of multiplexing the two kinds of packets so as not to collide with each other and outputting the multiplexed packets to the post-stage processing device 80.

Figure 15:
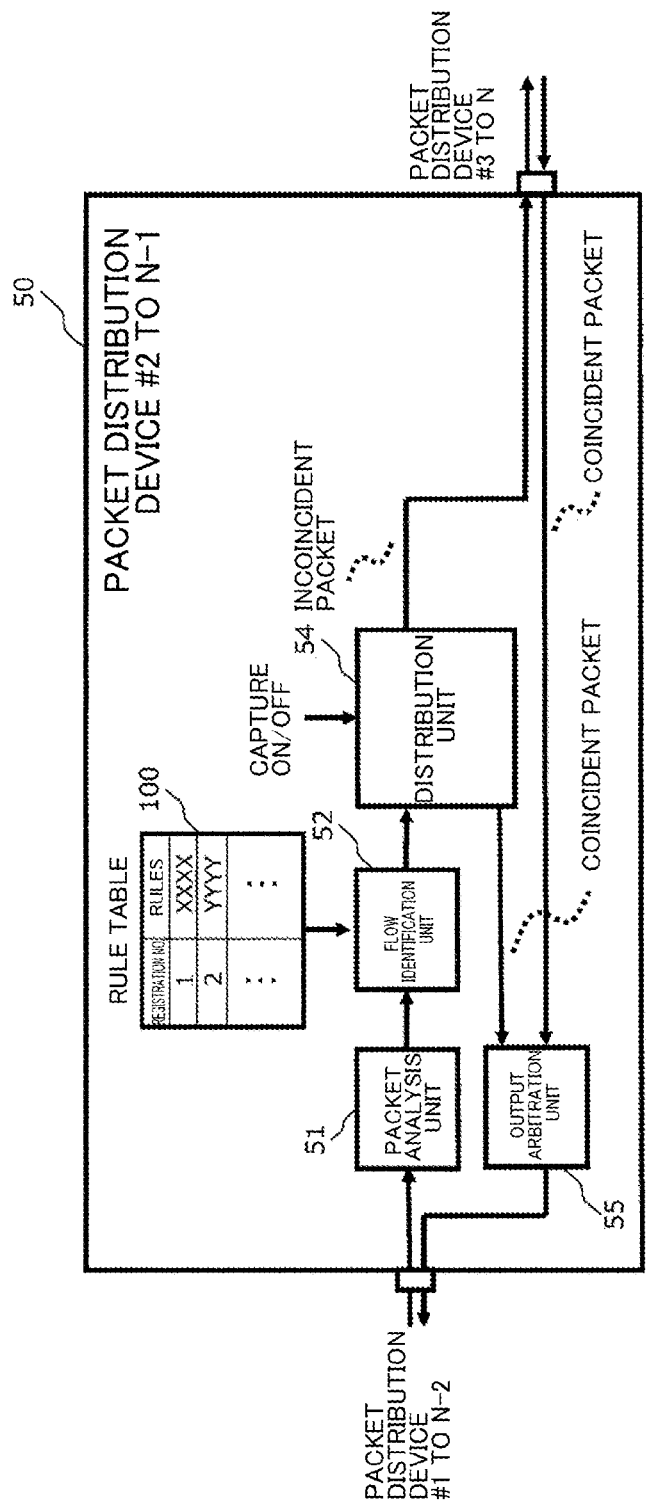
FIG. 15 is a diagram illustrating a configuration example of a middle-stage packet distribution device according to the fourth embodiment of the present invention.
Figure 16:
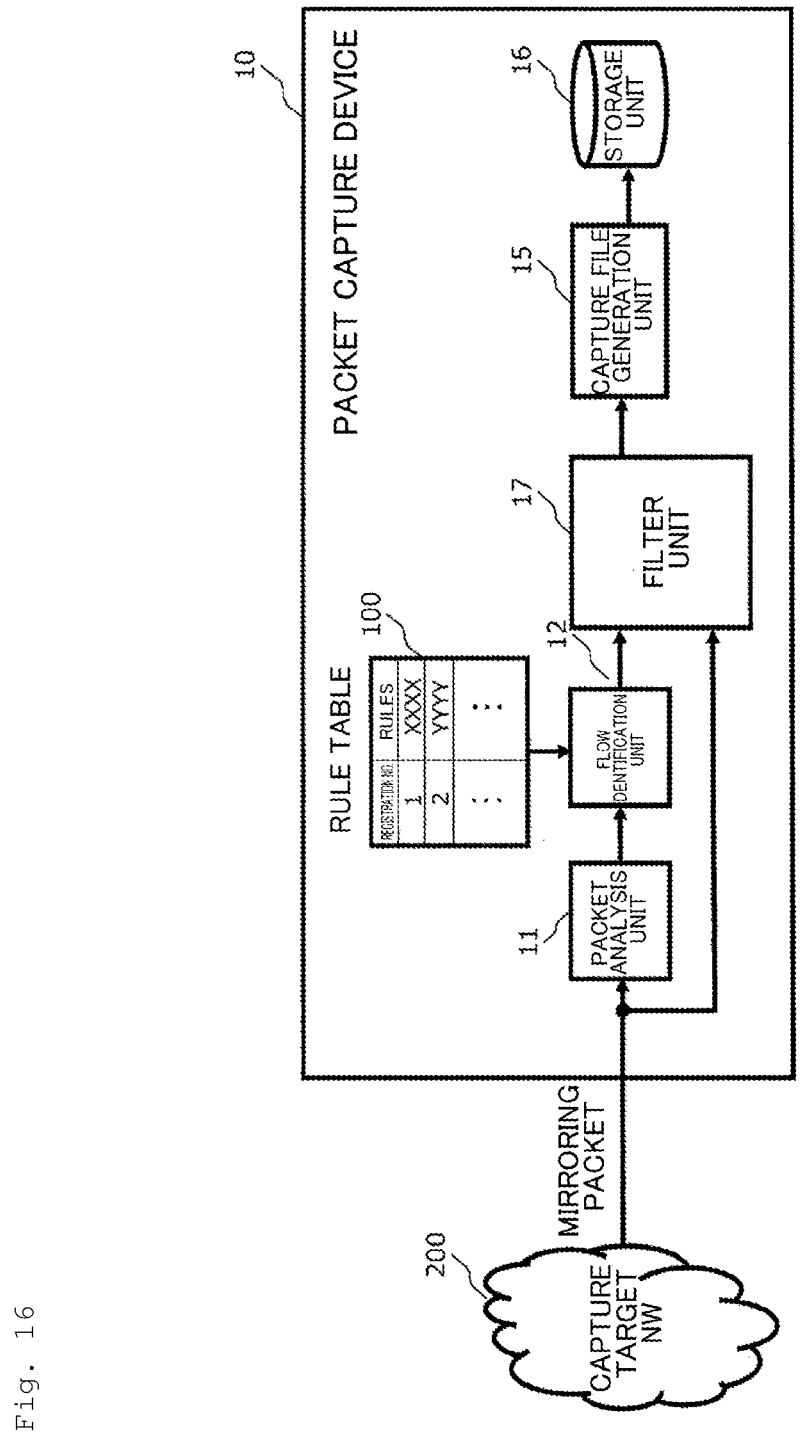
FIG. 16 is a diagram showing the configuration of a conventional packet distribution device.

FIG. 15 shows a configuration example of the middle-stage packet distribution device (#2 to #N-1). The difference from the first-stage packet distribution device 40 (#1) are that the time stamp unit 43 is not provided, that the number of ports linked with the external equipment is two ports smaller by one port than the first-stage packet distribution device 40, and that the output destination from the output arbitration unit 55 is the packet distribution device in the preceding-stage of cascade-connection. The function of the output arbitration unit is the same as that of the first-stage distribution device 40 (#1).

Although not shown in the figure, the last-stage packet distribution device 60 (#N), as compared with the middle-stage packet distribution device 50 (#2 to #N-1), is different in that the number of ports linked with the external equipment is one port smaller by one port than the middle-stage packet distribution device 50 and that the filter unit (not shown) for discarding the packets of the flow not to be captured is provided.

As described above, according to the fourth embodiment, the configuration number of devices and the number of ports can be minimized, and packet capture of the ultra-large amount of packets in consideration of scalability can be performed.

Fifth Embodiment

In the first to fourth embodiments, a configuration in which a plurality of packet distribution devices are cascade-connected and packet captures of (N×Nf) flows can be performed has been described. In the present embodiment, a packet capture system capable of capturing flows of (N×Nf) or more by utilizing the fact that the packet analysis unit of the first-stage device can be shared among all the devices in the cascade-connection will be described.

In the present embodiment, the packet analysis unit of the first-stage packet distribution device #1 embeds information indicating the analysis result in the packet. The packet distribution devices #1 to #N on and after the middle-stage identifies the flow of the capture target by using the analysis result.

As the information indicating the analysis result, for example, a number indicating a packet type can be considered. In the packet distribution device #1 to #N on and after the middle-stage, a table or the like showing the correspondence relation between the packet type and the number is prepared, and the header type can be specified only by the processing for comparing the number showing the analysis result embedded in the packet with the number showing the packet type of the table. In the packet distribution devices #1 to #N on and after the middle-stage, processing for analyzing the header from the head of the packet is not required.

With such a configuration, in the present embodiment, a circuit related to the packet analysis unit section is simpler than that of the first-stage packet distribution device #1 in the packet distribution device on and after the middle-stage, and the surplus resources can be allocated to the increment of the number of rules Nf or the like.

Extension of Embodiment

The present invention has been described thus far with reference to the embodiments, but the present invention is not limited to the above embodiments. The configuration and details of the present invention can be altered in various manners which can be understood by those skilled in the art within the scope of the present invention.

REFERENCE SIGNS LIST

1 Packet capture system
10, 20, 30 Packet distribution device
11, 21, 31 Packet analysis unit
12, 22, 32 Flow identification unit
13 Time stamp unit
14, 24 Distribution unit
34 Filter unit
15, 25, 35 Capture file generation unit
16, 26, 36 Storage unit
37 Filter unit
100 Rule table
200 Capture target network.

The invention claimed is:

1. A packet capture system for capturing packets flowing through a capture target network, comprising:
   a plurality of stages of packet distribution devices that are cascade-connected and configured to capture packets of a specific flow;
   wherein each of the plurality of stages of packet distribution devices includes a memory, a hardware processor, a packet analyzer configured to analyze inputted packets and a flow identifier configured to identify a flow to be captured;
   wherein packet distribution devices of the plurality of stages of packet distribution devices other than a last-stage packet distribution device of the plurality of stages of packet distribution devices include a distributor configured to distribute the inputted packets to capture the packets of the flow to be captured and configured to output packets of a flow not to be captured to a next-stage packet distribution device; and
   wherein the last-stage packet distribution device of the plurality of stages of packet distribution devices includes a filter configured to filter the inputted packets to capture the packets of the flow to be captured and configured to discard the packets of the flow not to be captured.

2. The packet capture system according to claim 1, wherein a first-stage packet distribution device of the plurality of stages of packet distribution devices includes a time stamp device configured to insert a packet arrival time point information in a header of the inputted packets.

3. The packet capture system according to claim 1, wherein a packet analyzer of a first-stage packet distribution device of the plurality of stages of packet distribution devices is configured to embed a packet analysis result in the inputted packets.

4. A packet capture system for capturing packets flowing through a capture target network, comprising:
   a plurality of stages of packet distribution devices that are cascade-connected and configured to distribute packets of a specific flow;
   a switch configured to collect outputs of the plurality of stages of packet distribution devices; and
   a processing device configured to capture packets output by the switch;
   wherein each of the plurality of stages of packet distribution devices includes a memory, a hardware processor, a packet analyzer configured to analyze inputted packets, a flow identifier configured to identify a flow to be captured, and a distributor configured to distribute packets of the flow to be captured and packets of a flow not to be captured;
   wherein distributors of the plurality of stages of packet distribution devices other than a last-stage packet distribution device of the plurality of stages of packet distribution devices are configured to transmit the packets of the flow to be captured to the switch and output the packets of the flow not to be captured to a next-stage packet distribution device; and wherein a distributor of the last-stage packet distribution device of the plurality of stages of packet distribution devices includes a filter configured to filter the inputted packets to capture the packets of the flow to be captured and configured to discard the packets of the flow not to be captured.

5. The packet capture system according to claim 4, wherein a distributor of a first-stage packet distribution device of the plurality of stages of packet distribution devices is configured to start or stop packet distribution based on a trigger signal transmitted from the processing device.

6. The packet capture system according to claim 4, wherein a first-stage packet distribution device of the plurality of stages of packet distribution devices includes a time stamp device configured to insert a packet arrival time point information in a header of the inputted packets.

7. The packet capture system according to claim 4, wherein a packet analyzer of a first-stage packet distribution device of the plurality of stages of packet distribution devices is configured to embed a packet analysis result in the inputted packets.

8. A packet capture system for capturing packets flowing through a capture target network, comprising:

a plurality of stages of packet distribution devices that are cascade-connected and configured to distribute packets of a specific flow; and a processing device configured to capture packets output by a first-stage packet distribution device of the plurality of stages of packet distribution devices;

wherein each of the plurality of stages of packet distribution devices includes a memory, a hardware processor, a packet analyzer configured to analyze inputted packets, a flow identifier configured to identify a flow to be captured, and a distributor configured to distribute packets of the flow to be captured and packets of a flow not to be captured;

wherein a first-stage packet distribution device of the plurality of stages of packet distribution devices is configured to output the packets of the flow not to be captured to a next-stage packet distribution device and transmit the packets of the flow to be captured and packets transmitted from a next-stage packet distribution device to the processing device;

wherein a last-stage packet distribution device of the plurality of stages of packet distribution devices is configured to transmit the packets of the flow to be captured to a preceding-stage packet distribution device and to discard the packets of the flow not to be captured; and wherein when a middle packet distribution device is connected between the first-stage packet distribution device and the last-stage packet distribution device, the middle packet distribution device is configured to output the packets of the flow not to be captured to a next-stage packet distribution device and transmit the packets of the flow to be captured and the packet transmitted from the next-stage packet distribution device to a preceding-stage packet distribution device.

9. The packet capture system according to claim 8, wherein the first-stage packet distribution device of the plurality of stages of packet distribution devices includes a time stamp device configured to insert a packet arrival time point information in a header of the inputted packets.

10. The packet capture system according to claim 8, wherein a packet analyzer of the first-stage packet distribution device of the plurality of stages of packet distribution devices is configured to embed a packet analysis result in the inputted packets.

* * * * *